United States Patent [19]

Kunz et al.

[11] Patent Number: 4,921,888

[45] Date of Patent: May 1, 1990

[54] LOW TEMPERATURE CURE EMULSIONS

[75] Inventors: Barbara L. Kunz, Bay Village; Kenneth G. Hahn, Jr., Hinckley, both of Ohio

[73] Assignee: The Glidden Company, Cleveland, Ohio

[21] Appl. No.: 144,937

[22] Filed: Jan. 19, 1988

[51] Int. Cl.$^5$ ............................................ C08L 13/02
[52] U.S. Cl. .................................. 523/310; 524/555; 524/556
[58] Field of Search ................. 523/310; 524/556, 555

[56] References Cited

U.S. PATENT DOCUMENTS 4,525,260 6/1985 Abbey et al. .................... 524/555
4,728,680 3/1988 Hahn, Jr. ............................ 523/310

Primary Examiner—Joseph L. Schofer
Assistant Examiner—R. H. Delmendo
Attorney, Agent, or Firm—Thomas M. Schmitz

[57] ABSTRACT

A stabilized aqueous, thermosetting coating composition substantially free of acid cure catalysts comprises a mixture of an ion-exchanged reactive function emulsion polymer and a glycoluril derivative adapted to coreact and crosslink the functional polymer where certain cations are added to the ion-exchanged mixture to provide a pH of the mixture between 2 and 5.

4 Claims, No Drawings

LOW TEMPERATURE CURE EMULSIONS

BACKGROUND OF THE INVENTION

This relates to commonly assigned U.S. Ser. No. 943,794 filed Dec. 19, 1986, now U.S. Pat. No. 4,728,680 and the disclosure of said application incorporated herein by reference. This invention pertains to emulsion coatings treated by cation exchange where emulsion polymers contain hydroxyl or carboxyl groups but are free of amine groups. The stable reactive coating is based on ion-exchange of a water dispersed mixture of glycoluril resin and acrylic emulsion polymer containing carboxyl and/or hydroxyl groups but free of amine groups, where certain cation salts are added to increase the pH of the coating without adversely affecting the thermosetting cure of the coating.

Prior to this invention, glycoluril cured thermosettng emulsions were produced from non-ionic and acidic surfactants and generally required high levels of such surfactants. Anionic salt surfactants cause a detriment to the curing reaction while pigmentation of such glycoluril and emulsion mixtures cause undesirable flocculation during the pigment grind step and subsequent let-down to produce pigmented mixtures.

Prior art U.S. Pat. Nos. 4,442,257 and 4,444,941 teach the use of certain acrylic latexes crosslinked with either tetramethylol glycoluril (TMGU) or dihydroxy dimethyl ethylene urea (DDEU) for low-temperature curing coatings. Rapid cure is achieved with these products by adding from 1.5% to 3.5% by weight of a 40% solution of paratoluene sulfonic acid where a package pH of about 1.0 to 2.0 results. Stability of these catalyzed products ordinarily is limited to 1-5 days at room temperature, and much less at elevated temperatures. Hence, the acid catalyst must be added at the time of use. Cured films of such polymeric mixtures often exhibit certain water sensitivity due to residual catalyst in the cured films. Without the acid catalysts, however, the coating has no solvent or water resistance unless baked at extremely high temperatures.

Abbey (U.S. Pat. No. 4,525,260) discloses a cationic latex for cathodic electrocoating and specifically includes amine monomers. The reference latex is based on acrylic monomers copolymerized with amine monomers, such as N,N-dimethyl-2-aminoethyl methacrylate, and catalyzed with an azo catalyst. Abbey subsequently treats the cationic latex with an ion exchange resin but to specifically remove amino monomers and amino initiator fragments. Hence, the reference is specifically directed to removing amino fragments introduced in the emulsion process. As noted below, amine latexes are not operative in this invention in that amine groups block coreactivity with a glycoluril cross-linker and inhibit the cure.

In commonly assigned U.S. Serial No. 943,794 filed December 12, 1986, low temperature cure emulsion polymers particularly useful in paint coatings are disclosed based on a thermosetting polymeric binder composition comprising a functional addition polymer containing functional hydroxyl or carboxyl groups, but free of amine groups, and a glycoluril derivative adapted to be coreactive with the functional polymer. The functional polymer and preferably the glycoluril derivative are treated with an ion exchange process step to remove undesirable cations. The resulting resin provides a highly desirable low temperature cure paint coating adapted to thermoset without the addition of undesirable acid catalysts. However, it has been found that cation exchanged polymeric mixtures based on functional emulsion polymers adapted to be coreactive with glycoluril derivatives and pigmented with considerable amounts of considerable commercial titanium dioxide exhibit an upward pH drift of as much as one pH unit within a few days after cation exchange of the polymeric binder and/or the paint coating, which does not seem to materially effect the statility or low heat cures, but nevertheless limits the commercial utility of process to darker color paints.

It now has been found that cation-exchanged polymeric compositions, wherein the great majority of soluble cations have been replaced by protons, the composition comprising functional emulsion polymers and coreactive glycoluril used in paint coatings can be substantially improved by the addition of additive amounts of certain cation salts to adjust the pH without loss of cure and thermosetting properties. The use of certain cation salts to adjust the pH upwardly provides considerable flexibility to paint formulations including versatility with respect to light colored pigmented paint coatings. The addition of various mono-and polyvalent cation salts to cation-exchanged reactive latex/glycoluril blends causes an increase in the pH of the blend with no detrimental effect on cure properties. By using this technique, the pH of cation-exchanged glycoluril coatings may be adjusted to reduce the possiblity of hydrolysis or degradation of certain paint components and/or simplify pigmentation, for example, without inhibiting the crosslinking reaction. A coating pH above 2 and preferably above 3 effectively avoid corrosion problems when the coating is applied to steel substrates. These and other advantages will become more apparent by referring to the detailed description and illustrative examples.

SUMMARY OF THE INVENTION

Briefly, the invention pertains to a stabilized clear or pigmented aqueous dispersion suitable for use as a thermosetting paint coating which comprises, water, one or more acrylic or acrylic-modified binder latexes, a crosslinking glycoluril derivative adapted to cure with said binder latexes, and certain cation salts. The acrylic emulsion polymer contains hydroxyls or carboxyls but is free of amine groups. The composition is produced by first producing the glycoluril and emulsion polymer dispersion and then treating the same with an ion exchange resin, preferably a cation exchange resin, individually or together, to provide a binder composition having superior storage stability. Additive amounts of cation salts are added to the polymeric binder to provide a paint coating which cures without the addition of acid cure catalyst. The present invention provides a stable, thermosetting paint coating which, when cured at moderate temperatures or heated in a baking oven, reacts to form a crosslinked film with excellent film integrity properties.

DETAILED DESCRIPTION OF THE INVENTION

In accordance with this invention, a post ion-exchange treatment of aqueous disperions of glycoluril and emulsion polymer is affected to remove cations from the disperions followed by the addition of additive amounts of certain cation salts.

Post ion-exchange treatment is best effected with protonated cation exchange resin. Protonated cation exchange resin typically comprises crosslinked macroreticular polystyrene beads having sulfonic acid surface groups, that is, the beads have a sulfonated surface. Bead sizes are typically about 1 millimeter in diameter more or less. In the present invention, the coating is not externally catalyzed, but is brought into intimate contact with a protonated cation exchange resin, such as Amberlite 200 CH from Rohm and Haas. This contact can be effected by adding from 1%-100% by weight of the exchange resin to the coating with agitation and mixing until the pH has stabilized below 2.5, and typically between 1.2 and 1.8. The mixture can be strained through a filter medium such as linen cloth of a size small enough to remove all of the solid exchange resin, or the coating can be passed over a column bed of the exchange resin at a rate which yields a coating pH of less than 2.5, preferrably between 1.2 and 1.8. The resulting polymers exhibit no change in stability or in pH or viscosity apparent over a 3-month period. In accordance with the invention, cation salts are subsequently added to the ion-exchanged polymers at levels to yield a final pH between about 2.0 and about 5.0. Typically at least 0.05%, and preferably between 0.1 and 1% by weight cation salt is added based on the combined weight of acrylic polymer and glycoluril depending on the complexity of the salt.

The useful cation salts of this invention are those which, when added to the cation-exchanged coating, provide an increase in pH to the desired range of about 2.0–5.0, but which do not substantially inhibit the subsequent reaction of the coating when applied and cured. Among the useful cations of this invention are aluminum, calcium, iron, potassium, ammonium, and similar cations. Among the useful counterions of this invention are hydrogen phosphate, dihydrogen phosphate, acetyl acetonante, chromate, dichromate, carbonate, and similar counterions.

Referring next to the reactive emulsion polymer, the reactive polymer contains reactive hydroxyl, carboxyl, or acrylamide groups, but is free of amine groups. The emulsion polymer preferably comprises copolymerized ethylenically unsaturated monomers including at least about 2% by weight copolymerized reactive monomers of acrylamide, carboxyl monomer, or hydroxyl monomer. The acrylamide monomers can be acrylamide, methacrylamide, ethyacrylamide; and similar alkyl acrylamide and methacrylamide monomers including for example, N-methylol acrylamide, N-ethanol acrylamide N-propanol acrylamide, N-methylol methacrylamide, N-ethanol methacrylamide, and similar acrylamide and methacrylamide monomers. Carboxyl containing monomers are ethylenically unsaturated monomers containing carboxyl groups, including lower alkyl acrylate or methacrylate monomers such as acrylic, methacrylic, or ethacrylic acid. Other useful carboxyl reactants include itaconic, citriconic, fumaric, maleic, mesaconic and aconitric acids. The preferred acids are acrylic and methacrylic acids. Hydroxyl containing monomers are ethlenically unsatuated monomers containing a hydroxyl group and can include for example, hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Ethylenically unsaturated monomers other than acrylamide, carboxyl, and hydroxyl monomers can include vinyl unsaturated monomers containing vinyl double bond unsaturation including, for example, vinyl esters such as vinyl acetate, vinyl propionate, vinyl butyrates, vinyl benzoate, isopropenyl acetate and like vinyl esters; vinyl amides, such as acrylamide and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl crylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy catalyst, common redox catalyst, ultraviolet radiation, or the like.

Preferred latex binders for this invention are acrylic or modified acrylic binders such as set forth in U.S. Pat. Nos. 4,444,941 and 4,442,257, provided the emulsion polymer is free of amine groups. A preferred emulsion polymer free of amine groups preferably comprises by weight between 20% and 95% acrylate or methacrylate monomers, 1% and 20% functional monomer selected from a carboxyl monomer, a hydroxyl monomer, or acrylamide monomer, or mixtures of such functional monomers, and 0% to 50% other ethylenically unsaturated monomer. A preferred emulsion polymer comprises a latex polymer consisting of copolymerized monomers of 20%–50% methyl methacrylate, 0%–20%% ethyl acrylate, 20%–50% butyl acrylate, and 1%–20% of a hydroxyl-bearing monomer with minor amounts of other ethylenic monomers, if desired.

The reactive emulsion polymer containing reactive hydroxyl, carboxyl, or acrylamide groups can be cross-linked by reaction with a glycoluril derivative. Glycoluril derivatives are disclosed in U.S. Pat. No. 4,064,191 and are also known as acetyleneureas. Glycolurils are derived by reacting two moles of urea with one mole of glyoxal to provide a complex ring structure as shown in U.S. Pat. No. 4,540,735; where substitute constituents can be a hydrogen, or a lower alkyl radical, or can be methylolated partially or fully by reacting with 1 to 4 moles of formaldehyde to provide am ethylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include for example, mono- and dimethylether or dimethylol glycoluril, the trimethylether of tetramethylol glycoluril, the tetramethylether or teramethylol glycoluril, tetrakisthoxymethyl glycolluril, tetrakisopropoxymethyl glycoluril, tetrakisbutoxymethyl glycoluril, etrakisamyloxymethyl glycoluril, tetrakishexoxymethyl glycoluril and the like. Glycoluril derivatives can further include dimethylol dihydroxyl ethylene urea.

In practice, the ethylenic monomers can be polymerized in an aqueous medium at a pH preferably between about 1.0 and 6 to form a reactive emulsion polymer. Generally, the polymerization is conducted at a temperature of about 20°-100° C. in the presence of a free radical generating initiator. Commmonly used free radical initiators include various peroxygen compounds such as the persulfates, benzoyl peroxide, t-butyl hydroperoxide, cumene hydroperoxide, di-t-butyl perphthalate, pelargonyl peroxide and 1-hydroxycyclohexyl hydroperoxide. Particularly preferred as polymerization initiators are the water-soluble peroxygen compound such as hydrogen peroxide and the sodium, potassium and ammonium persulfates used by themselves or in activated "redox" type systems. Typical "redox" systems include alkali metal persulfates with a reducing substance such as a polyhydroxy phenol. The amount of initiator used will generally be in the range between about 0.1% to 3% by weight based on the monomers and preferably is maintained between 0.15% and 1% by weight of the monomers. Usually the initiator will all be charged at the outset of the polymerization; however, incremental addition or proportioning of the initiator is often employed.

Emulsifiers used to prepare the latices of this invention are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanol-amine lauryl sulfate, ethylamide lauryl sulfate; alkyli metal and ammonium salts of sulfonated petroleum or paraffin oils, sodium salts of aromatic sulfonic acids, such ad dodecane-1-sulfonic acid and octadiene-1-sulfonic acid; aralkylsulfonates such as sodium isopropyl benzene sulfonate, sodium dedecyl benzene sulfonate and sodium isobutyl naphthalene sulfonate; alkali metal and ammonium salts of sulfonated dicarboxylic acid esters such as sodium dioctyl sulfosuccinate, disodium N-octadecysulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used can be from about 0.01 to 6% or more by weight of the monomers. All of the emulsifier may be added at the beginning of the polymerization or may be added incrementally or by proportioning throughout the run. Typical polymerizations for the preparation of the emulsion polymers of this invention are conducted by charging the monomers into the polymerization reactor which contains water and a portion of the emulsifying agent. The reactor and its contents are heated and the initiator added.

A coating is prepared by blending from about 20 to 95 parts of emulsion polymer with from about 5 to 80 parts of glycoluril derivative crosslinker, and preferably about 70 to 95 parts of emulsion polymer with about 5 to 30 parts of crosslinker. After cation exchange, cation salts are added at levels to yield a final pH between about 2.0 and 5.0.

In accordance with this invention, a very clear coating or uniform dispersion of pigments can be obtained, using conventional anionic and nonionic surfactants, whereupon cations are subsequently removed by batch exchanging with Amberlite 200 CH resin, lowering the pH to less than 2.0. This dispersion is stable and shows no flocculation when combined with ion-exchanged glycoluril. Accordingly, a stable dispersion can be made using conventional surfactants which subsequently can be acidified by cation exchange to provide compatibility and stability in let down steps and pigment grinds if desired. Conventional basic surfactant can be used as the dispersant to enable a dilatent-free pigment grind. Cation exchange prevents settling and flocculation and further prevents cure inhibition in the final paint. The addition of cation salts enable increasing the pH to about 5 without adversely affect the thermosetting cure properties.

The following examples, wherein percentages are by weight, further illustrate the merits of this invention.

EXAMPLE 1

A blend composed of 22.74% (weight, N.V.) Cymel 1175 (dimethylol dihydroxy ethylene urea) on latex N.V. was prepared. The latex polymer comprised by weight copolymerized monomers: 50% butyl acrylate; 38% methyl methacrylate; 6% hydroxy ethyl acrylate; 4% methacrylic acid, and 2% N-methyl acrylamide. This sample as cation exchanged using a column apparatus packed with Amberlite 200 CH, strong acid cation exchange resin in the protonated form (product of Rohm and Haas Co.). To this material was added 1,000 ppm (weight) of various cations including: calcium, iron, sodium, potassium, magnesium, and ammonium. Counterions vary, as shown in Table 1.

Drawdowns of each modified blend were prepared using a 0.003 inch Bird blade and Leneta paper, secured onto a vacuum plate. A cure cycle of 2.5 minutes at 250° F. was used for each film, after which an overnight equilibrium at ambient temperature was allowed.

The data in Table 1 shows that, while an increase in pH greater than 2.0 causes a decrease in the coating's cure response in most cases, there are specific salts that can be added which cause sharp pH increases with no corresponding decline in cure.

TABLE 1

Effect of Salt Addition on Physical Properties of Cation Exchanged Latex/Glycoluril Blends

| Salt | pH | MEK Resistance (Double Rubs) | D.I. Water Resistance (Double Rubs) |
|---|---|---|---|
| None | 1.84 | >100 | >100 |
| CaCl$_2$ | 1.50 | >100 | >100 |
| CaSO$_4$ | 1.88 | >100 | >100 |
| CaHPO$_4$.2H$_2$O | 3.05 | >100 | >100 |
| FeCl$_2$.4H$_2$O | 1.54 | >100 | >100 |
| Fe(NO$_2$).9H$_2$O | 1.45 | >100 | >100 |
| Fe$_3$-acetyl acetonate | 2.14 | >100 | >100 |
| Fe$_2$(SO$_4$) | 1.79 | >100 | >100 |
| KBr | 1.54 | >100 | >100 |
| KCl | 1.58 | >100 | >100 |
| K$_2$CO$_3$ | 3.34 | 33 | 16 |
| KOH | 3.59 | 38 | 13 |
| K$_2$S$_2$O$_8$ | 1.76 | >100 | >100 |
| K$_2$Cr$_2$O$_7$ | 4.52 | >100 | >100 |
| KI | 1.78 | >100 | >100 |
| KH$_2$PO$_4$ | 2.09 | >100 | >100 |
| KNO$_3$ | 1.75 | >100 | >100 |
| MgCl$_2$ | 1.53 | >100 | >100 |
| Mg(NO$_2$)$_2$ 6H$_2$O | 1.80 | >100 | >100 |
| MgSO$_4$ | 1.88 | >100 | >100 |
| NaCl | 1.54 | >100 | >100 |
| Na$_2$CO$_3$ | 2.81 | 30 | 70 |
| NaHCO$_3$ | 4.05 | 50 | 10 |
| Na$_2$S$_2$O$_5$ | 1.73 | >100 | >100 |
| NaOH | 4.31 | 30 | 10 |

TABLE 1-continued

Effect of Salt Addition on Physical Properties of Cation Exchanged Latex/Glycoluril Blends

| Salt | pH | MEK Resistance (Double Rubs) | D.I. Water Resistance (Double Rubs) |
|---|---|---|---|
| $Na_2HPO_4$ | 4.32 | 41 | 19 |
| $Na(CrO_3)_2$ | 4.45 | >100 | 63 |
| $Na_2SO_3$ | 4.76 | 35 | 10 |
| $(NH_4)_2CO_3$ | 2.74 | >100 | >100 |
| $(NH_4)_2HPO_4$ | 4.22 | >100 | >100 |
| $NH_4F.HF$ | 3.22 | 33 | >100 |
| $(NH_4)_2S_2O_8$ | 1.88 | >100 | >100 |

EXAMPLE 2

An 80:20 blend of latex (emulsion polymer of 50% butyl acrylate, 38% methyl methacrylate, 6% hydroxy ethyl acrylate, 4% methacrylic acid, and 2% N-methyl acrylamide) and Cymel 1175 (DDEU) was prepared. Part of the sample was set aside for later testing; the remainder was cation exchanged as in Example 1. The pH of the unexchanged sample was 4.0; and the pH of the exchanged blend was 1.8.

The used exchange resin (Amberlite 200 CH) was rinsed with deionized water until clean, and then treated with 1 normal hydrochloric acid to remove any cations extracted from the coating. Analysis of the acid rinse revealed the presence of sodium and ammonium cations; but aluminum, cadmium, calcium, chromium, copper, iron, lead, magnesium, potassium, silicon, and zinc ions were not found at the lower detection limit of 1 part per million.

Samples of the exchanged and unexchanged blends were applied by a 0.003 inch Bird applicator to Leneta Form 7B paper, and baked for 2 minutes at 250° F. in a hot air oven. The samples were then tested for water resistance.

| | Water Rubs | Water Spot |
|---|---|---|
| Blend, as is | 43, fail | 10 seconds, whitens no film integrity. |
| Blend, Exchanged | 150, no effect | 20 minutes, no effect |

From this, it was then determined whether the reaction was inhibited by pH around 4.0 (absence of protons in water solution) or by the presence of sodium or ammonium cations. To portions of the exchange blend were added quantities of $CaHPO$ sufficient to increase the pH to 2.8, 3.2, and 3.9 after equilibrium. To other portions were added quantities of $(NH_4)_2HPO_4$ sufficient to increase the pH of those samples to 3.3, 3.6, and 3.7 after stabilization.

These 6 samples were coated and baked as above, and tested for water resistance.

| $CaHPO_4$ | Water Rubs | Water Spot |
|---|---|---|
| pH 2.8 | 150, no effect | 20 minutes, no soften |
| pH 3.2 | 150, no effect | 20 minutes, no soften |
| pH 3.9 | 150, no effect | 20 minutes, sl. whiten, no soften |

| $(NH_4)_2HPO_4$ | Water Rubs | Water Spot |
|---|---|---|
| pH 3.3 | 150, no effect | 20 minutes, no soften |
| pH 3.6 | 150, no effect | 20 minutes, no soften |
| pH 3.7 | 150, no effect | 20 minutes, no soften |

Comparison of the water resistance of these coatings, wherein pH is adjusted to the same range as the unexchanged blends, but with different salts, clearly indicates that cure inhibition is caused by the presence of specific cations.

EXAMPLE 3

RCL-9 titanium dioxide (SCM Corp.) was slurried in deionized water which had been adjusted to pH 2.0 with 1 normal hydrochloric acid. After stirring 24 hours, the slurry was allowed to settle, and the supernatant liquid was decanted. This liquid was then ultrafiltered to remove any solids, and the liquid was then analyzed for cations. Aluminum, sodium, and calcium were found; these are therefore subject to acid attack and are potential cation contributors to the exchanged coatings.

EXAMPLE 4

A pigmented coating containing 210# of RCL-9 titanium dioxide (SCM Corp.) per 100 gallons of paint and an 80/20 ratio of latex (Ex. 2) Cymel 1175 was prepared.

To a sample of this coating (under agitation) were added small amounts of Amberlilte 200 CH protonated cation exchange resin. After each addition of Amberlite, the mix was agitated until pH stabilized. At that point a sample was removed, the exchange resin was filtered out, and the sample was applied to Leneta Form 7B paper using a 0.003 inch Bird applicator, and baked 2 minutes at 250° F. Cure was checked by methyl ethyl ketone rubs. The objective was to determine at what pH cure would improve.

| GMS. Amberlite 200 CH Added | Resultant pH | Cure (MEK RUBS) |
|---|---|---|
| 0 | 4.63 | <10 |
| 10.0 | 3.20 | 16–18 |
| +5.0 | 3.00 | 27–28 |
| +27.0 | 2.20 | 53–55 |
| +26.0 | 2.01 | 78–95 |
| +27.0 | 1.94 | 83–100 |

(The range of MEK rubs represents the variability in the test over replicates on a test panel.)

From this it is noted that when pH drops below about 2.20, there is a rapid acceleration of cure. At that point, a significant portion of the free cations in the paint have been removed. However, it is known that this grade of titanium dioxide contains aluminium oxide in the surface treatment, which as shown in Example II to be subject to the acid attack at a pH of 2.0.

A sample of the exchange paint was put in a 120° F. oven and checked for cure after various times, using the same application and cure as above with the following result.

| Time after Exchange @ 120° F. | pH | Cure (MEK Rubs) |
|---|---|---|
| 0 | 1.94 | 83–110 |
| 4 days | 3.24 | 83–110 |
| 12 days | 3.41 | 86 |

| -continued | | |
|---|---|---|
| Time after Exchange @ 120° F. | pH | Cure (MEK Rubs) |
| 18 days | 3.35 | >100 |

The pH increase is presumed due to dissolution of aluminum cations from the titanium dioxide, as shown in Example 3.

Comparison of the cure at this point with cure at a similar pH during exchange (83-110 MEK rubs @pH 3.24 vs. 16-18 MEK rubs @pH 3.20) indicates that aluminum cations do not significantly inhibit cure on this bake schedule as do sodium cations, which are known to be present from previous analyses.

We claim:

1. An aqueous, thermosetting coating composition substantially free of acid cure catalysts, the coating comprising on a weight basis:
    a polymeric blend of between about 20 and 95 parts of functionally reactive emulsion polymer and between 5 and 80 parts of glycoluril adapted to crosslink with said functionally reactive emulsion polymer, where said emulsion polymer and glycoluril are ion-exchange treated with a protonated cation exchange resin to reduce the pH of the polymeric blend to less than 1.8;
    said emulsion polymer being free of amine groups and comprising copolymerized ethylenically unsaturated monomers, between 20% and 95% acrylate or methacrylate monomers, between 1% and 20% functionally reactive monomers selected from a carboxyl monomer, a hydroxyl monomer or an acrylamide monomer, and between 0% and 20% other ethylenically unsaturated monomer, said monomers being polymerized in an aqueous medium to produce the emulsion polymer; and
    said ion-exchanged emulsion polymer and glycoluril having added thereto at least 0.05% by weight cation salt selected from $mCaHPO_4 2H_2O$, $Fe_3$-acetyl acetonante, $K_2Cr_2O_7$, $KH_2PO_4Na(CrO_3)_2$, $(NH_4)_2 CO_3$, $(NH_4)_2 HPO_4$, and $NH_4F \cdot HF$ and the pH of the resulting mixture is between 2 and 5.

2. The coating composition in claim 1 wherein between 0.1% and 1% cation salt is added to the ion-exchanged emulsion polymer and glycoluril.

3. The coating in claim 1 comprising between 70 and 95 weight parts said emulsion polymer and between 5 and 30 weight parts of glycoluril.

4. The coating in claim 1 wherein the mixture has a pH between 1.2 and 1.8 prior to the addition of said cation salt.

* * * * *